(12) United States Patent
Kikuzawa

(10) Patent No.: US 12,257,758 B2
(45) Date of Patent: Mar. 25, 2025

(54) FLEXIBLE TUBE PRODUCTION APPARATUS

(71) Applicant: PLA GIKEN CO., LTD., Osaka (JP)

(72) Inventor: Yoshiharu Kikuzawa, Osaka (JP)

(73) Assignee: PLA GIKEN CO., LTD., Osaka (JP)

( * ) Notice: Subject to any disclaimer, the term of this patent is extended or adjusted under 35 U.S.C. 154(b) by 130 days.

(21) Appl. No.: 18/102,986

(22) Filed: Jan. 30, 2023

(65) Prior Publication Data

US 2023/0249387 A1 Aug. 10, 2023

(30) Foreign Application Priority Data

Feb. 4, 2022 (JP) .................................. 2022-016664

(51) Int. Cl.
| | | |
|---|---|---|
| B32B 41/00 | (2006.01) | |
| B29C 48/10 | (2019.01) | |
| B29C 48/151 | (2019.01) | |
| B29L 23/00 | (2006.01) | |

(52) U.S. Cl.
CPC ............ B29C 48/10 (2019.02); B29C 48/151 (2019.02); *B29L 2023/005* (2013.01)

(58) Field of Classification Search
CPC . B29C 48/10; B29C 48/151; B29C 2948/926; B29C 2948/92904; B29C 48/156; B29C 48/21; B29C 48/2556; B29C 48/2692; B29C 48/2883; B29C 48/34; B29C 48/92; B29C 48/09; B29L 2023/005
USPC ..................... 156/60, 64, 350, 351, 378, 379
See application file for complete search history.

(56) References Cited

U.S. PATENT DOCUMENTS

| | | |
|---|---|---|
| 5,108,683 A | 4/1992 | Anand |
| 6,634,878 B1 | 10/2003 | Yanagawa et al. |
| 2015/0332814 A1 | 11/2015 | Gumina |
| 2017/0368733 A1 | 12/2017 | Kikuzawa |
| 2019/0351600 A1 | 11/2019 | Kikuzawa |

FOREIGN PATENT DOCUMENTS

| | | | |
|---|---|---|---|
| CN | 113715295 A | 11/2021 | |
| CN | 113815214 A | 12/2021 | |
| JP | 6144862 B1 | 6/2017 | |
| JP | 6916565 B1 | 8/2021 | |
| WO | WO-2021024794 A1 | * | 2/2021 |

* cited by examiner

*Primary Examiner* — Michael N Orlando
*Assistant Examiner* — Joshel Rivera
(74) *Attorney, Agent, or Firm* — Renner, Otto, Boisselle & Sklar, LLP

(57) ABSTRACT

A die has an inner die that has a straight portion of circular columnar outer shape and a convergent tapered portion provided closer to an extrusion port side than the straight portion and an outer die that houses the inner die. A first supply passage connecting a first valve and a flow passage, a second supply passage connecting a second valve and the flow passage, and a third supply passage connecting a third valve and the flow passage are provided inside the die. Downstream side end portions of the first supply passage and the second supply passage are connected to a portion of the flow passage formed between the straight portion and the outer die and a downstream side end portion of the third supply passage is connected to a portion of the flow passage formed between the tapered portion and the outer die.

5 Claims, 6 Drawing Sheets

FLEXIBLE TUBE PRODUCTION APPARATUS

CROSS REFERENCE TO RELATED APPLICATION

The disclosure of Japanese Patent Application No. 2022-016664 filed on Feb. 4, 2022 is incorporated in this description by reference.

BACKGROUND OF THE INVENTION

Field of the Invention

The present invention relates to a flexible tube production apparatus for extrusion molding a flexible tube constituted by covering an outer surface of a braided wire with a resin.

Description of the Background Art

In medical institutions, a tube-shaped medical device called a catheter is used to inject a drug solution or a contrast medium, etc., into a predetermined portion inside a living body of a patient or to take out a body fluid, etc., inside the living body. The catheter is inserted into the living body through a bent blood vessel, etc., and therefore, flexibility is required of a front end side portion such as to bend easily along a bent portion of the blood vessel, etc., without damaging the blood vessel, etc. On the other hand, an appropriate rigidity is required of a portion of the catheter not inserted into the living body such that operation of the catheter is made easy. Thus, various apparatuses for producing catheters with which hardness is changed gradually along a length direction such as to be flexible at the front end side and hard at a proximal side have been proposed. For example, an apparatus capable of producing a flexible tube that changes continuously in hardness along the length direction by extruding two types of resins that differ in hardness onto an outer surface of a braided wire while changing a mixing ratio of the resins is described in Japanese Patent Publication No. 6144862.

As a catheter with which safety can be improved further by suppressing damage of blood vessels, there is that with which a tubular portion called a soft tip constituted of a more flexible resin is provided at a front end portion. Although, conventionally, the soft tip portion is generally formed apart from the extrusion molded flexible tube and is joined to the front end of the flexible tube by fusion welding, etc., an apparatus capable of producing a flexible tube that is made to include a soft tip by inline extrusion molding is being examined (see, for example, Japanese Patent Publication No. 6916565).

SUMMARY OF THE INVENTION

Although the soft tip provided on the flexible tube suffices to be provided on a very short portion of the front end, with the flexible tube production apparatus described in Japanese Patent Publication No. 6916565, it is difficult to make the soft tip short. For example, with the flexible tube production apparatus described in Japanese Patent Publication No. 6916565, a resin for molding a portion that changes continuously in hardness in the length direction and a resin for molding the soft tip are supplied to a die via a switching valve mechanism. With this arrangement, even when the resin supplied to the die is switched to the resin for the soft tip by the switching valve mechanism, the other resin remains in a flow passage inside the die. Therefore, a mixture of the resin for the soft tip and the other resin is extruded until the resin inside the flow passage is replaced by the resin for the soft tip and a length of the soft tip portion formed at the front end portion thus becomes long.

Thus, an object of the present invention is to provide a flexible tube production apparatus that is capable of continuously extrusion molding a resin layer that gradually changes in hardness along a length direction and a soft tip at a front end and can yet make a length of the soft tip short.

In order to solve the above problem, a flexible tube production apparatus for extrusion molding a flexible tube includes a first extruder that extrudes a first resin, a second extruder that extrudes a second resin more flexible than the first resin, a third extruder that extrudes a third resin more flexible than the first resin and the second resin, a die that has a first penetrating hole through which a braded wire is inserted, an extrusion port extruding the resins onto a surface of the braded wire passing through the first penetrating hole, and a flow passage in communication with the extrusion port, a first valve that is switchable between a state in which the first extruder and the flow passage of the die are in communication and a state in which the first extruder and the flow passage of the die are interrupted from each other, a second valve that is switchable between a state in which the second extruder and the flow passage of the die are in communication and a state in which the second extruder and the flow passage of the die are interrupted from each other, and a third valve that is switchable between a state in which the third extruder and the flow passage of the die are in communication and a state in which the third extruder and the flow passage of the die are interrupted from each other. A first supply passage connecting the first valve and the flow passage, a second supply passage connecting the second valve and the flow passage, and a third supply passage connecting the third valve and the flow passage are provided inside the die. The die has an inner die that has a straight portion of circular columnar outer shape and a convergent tapered portion provided closer to the extrusion port side than the straight portion and an outer die that has a hollow portion and houses the inner die in the hollow portion with there being a predetermined interval, serving as the flow passage, from an outer surface of the inner die. Downstream side end portions of the first supply passage and the second supply passage are connected to a portion of the flow passage formed between the straight portion and the outer die and a downstream side end portion of the third supply passage is connected to a portion of the flow passage formed between the tapered portion and the outer die.

By the present invention, a flexible tube production apparatus that is capable of continuously extrusion molding a resin layer that gradually changes in hardness along a length direction and a soft tip at a front end and can yet make a length of the soft tip short can be provided.

The aforementioned and other objects, features, aspects, and effects of the present invention will be made clearer by the following detailed description made with reference to the accompanying drawings.

DESCRIPTION OF THE PREFERRED EMBODIMENTS

Hereinafter, an embodiment of the present invention will be described in detail. In the following description, an example where the present invention is applied to an apparatus for producing a flexible tube of an arrangement where a braid (mesh tube) is provided on an outer surface of an inner layer tube that is a resin layer and the braid is further covered with an outer layer tube that is a resin layer will be described. As an example of such a flexible tube, a catheter shaft can be cited. However, a catheter shaft is merely one example of a flexible tube and the present invention is also applicable to apparatuses for producing flexible tubes of other uses such as a flexible tube used in an endoscope, etc. In the present description, an extruder side will be referred to as an upstream side in a flow passage of resins and an extrusion port side of a die will be referred to as a downstream side in the flow passage of the resin.

Figure 1:
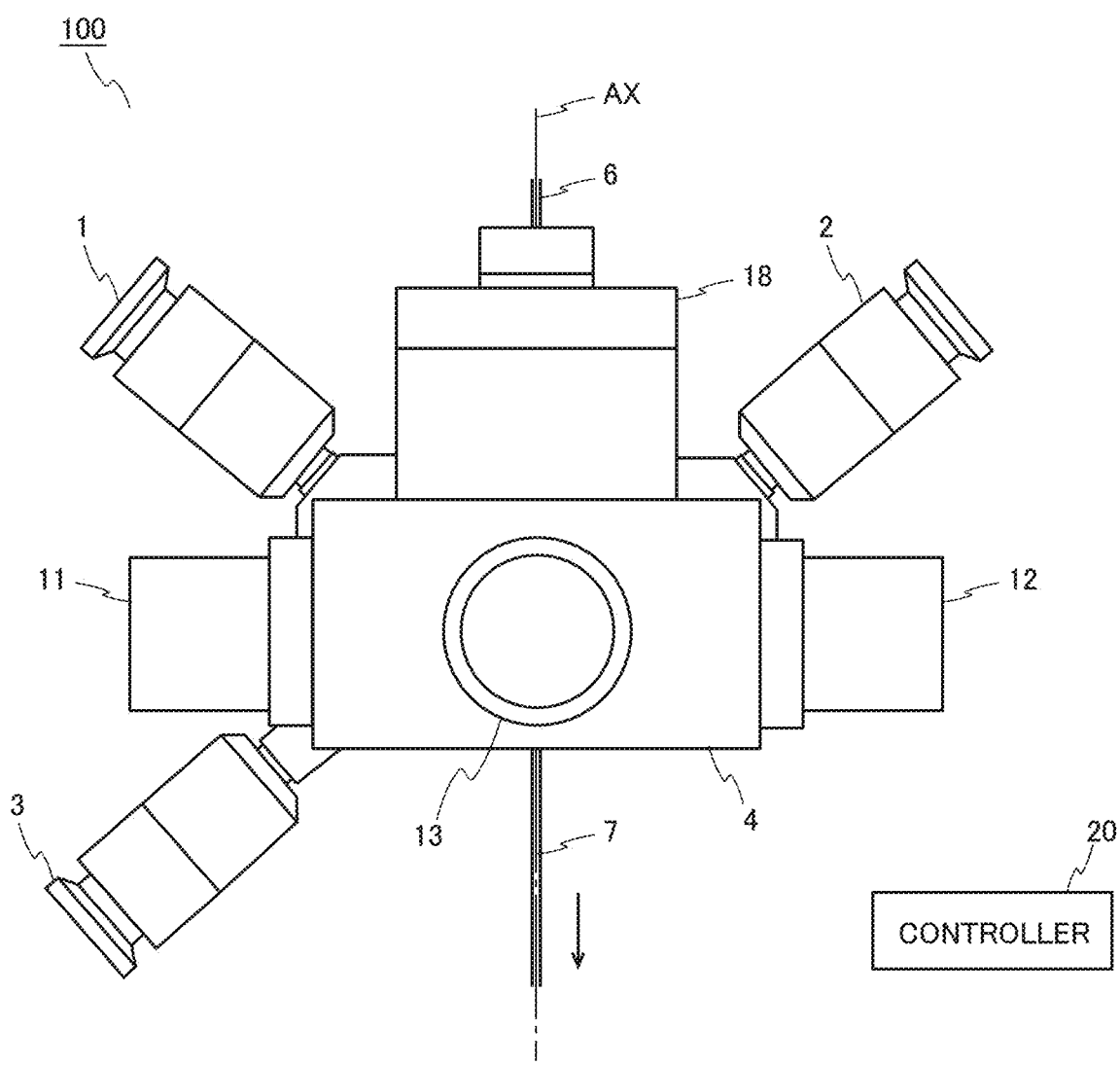
FIG. 1 is an upper view showing the general arrangement of a flexible tube production apparatus according to an embodiment.
Figure 2:
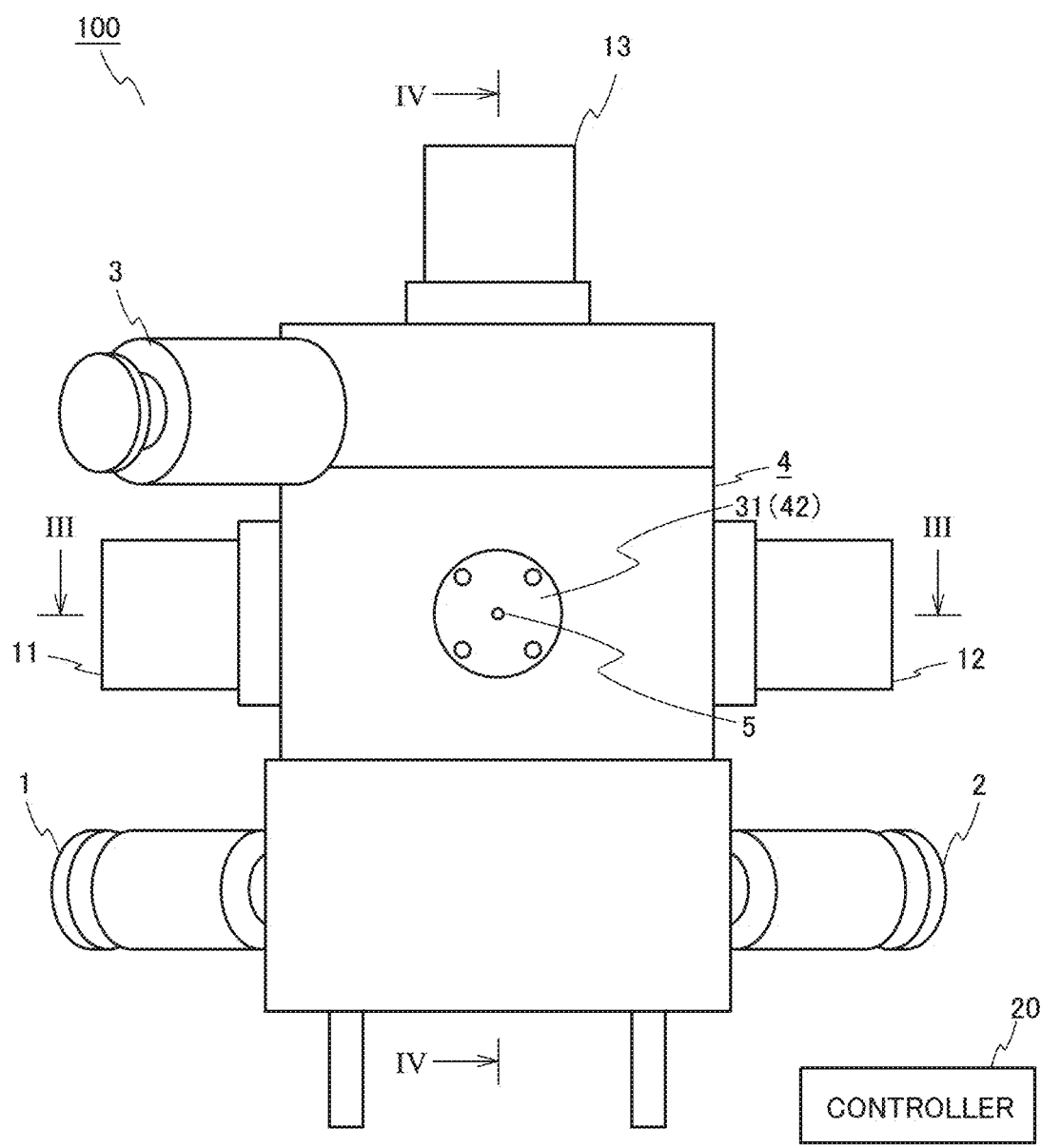
FIG. 2 is a front view showing the general arrangement of the flexible tube production apparatus shown in FIG. 1.
Figure 3:
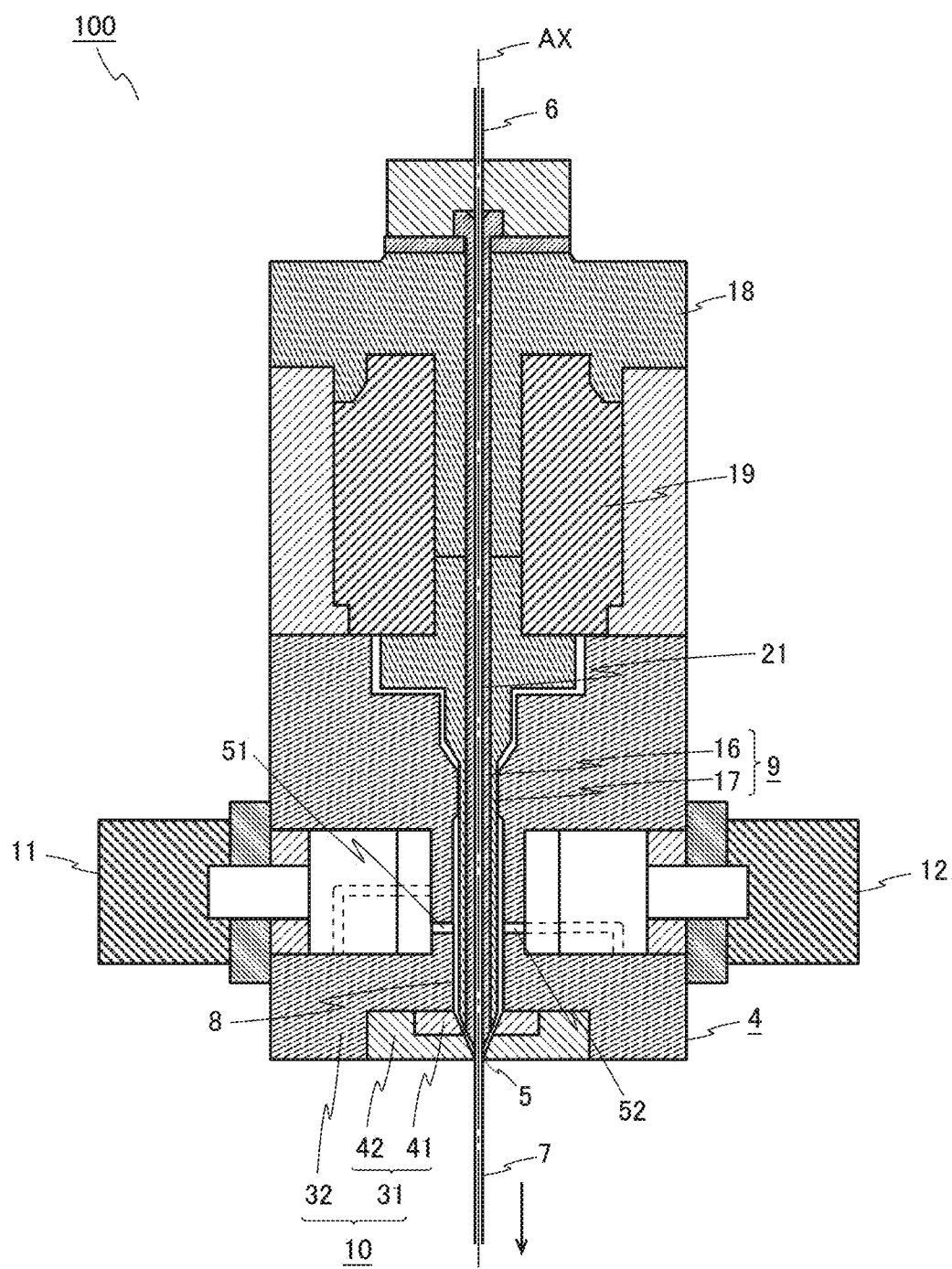
FIG. 3 is a sectional view taken along line shown in FIG. 2.
Figure 4:
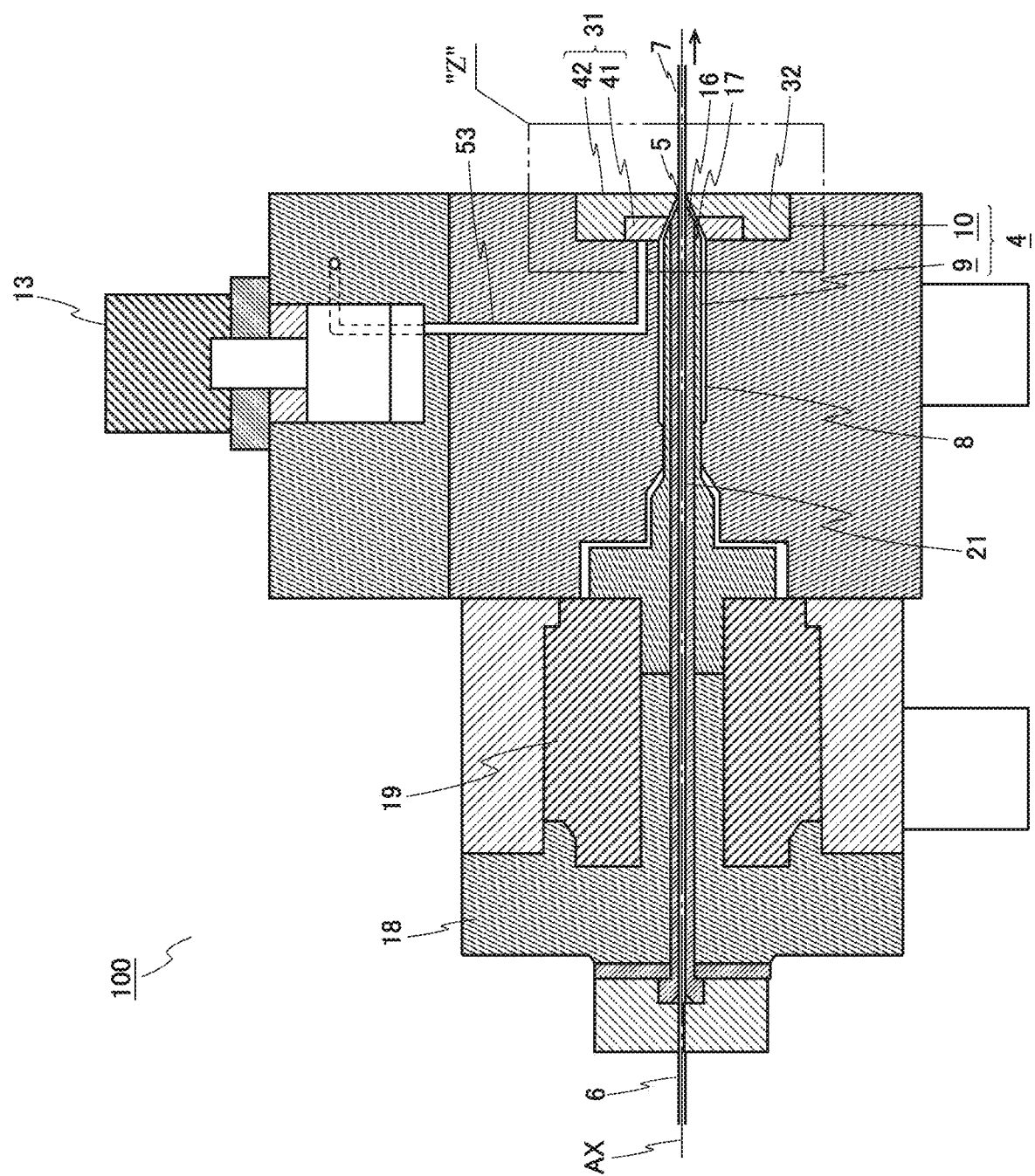
FIG. 4 is a sectional view taken along line IV-IV shown in FIG. 2.
Figure 5A:
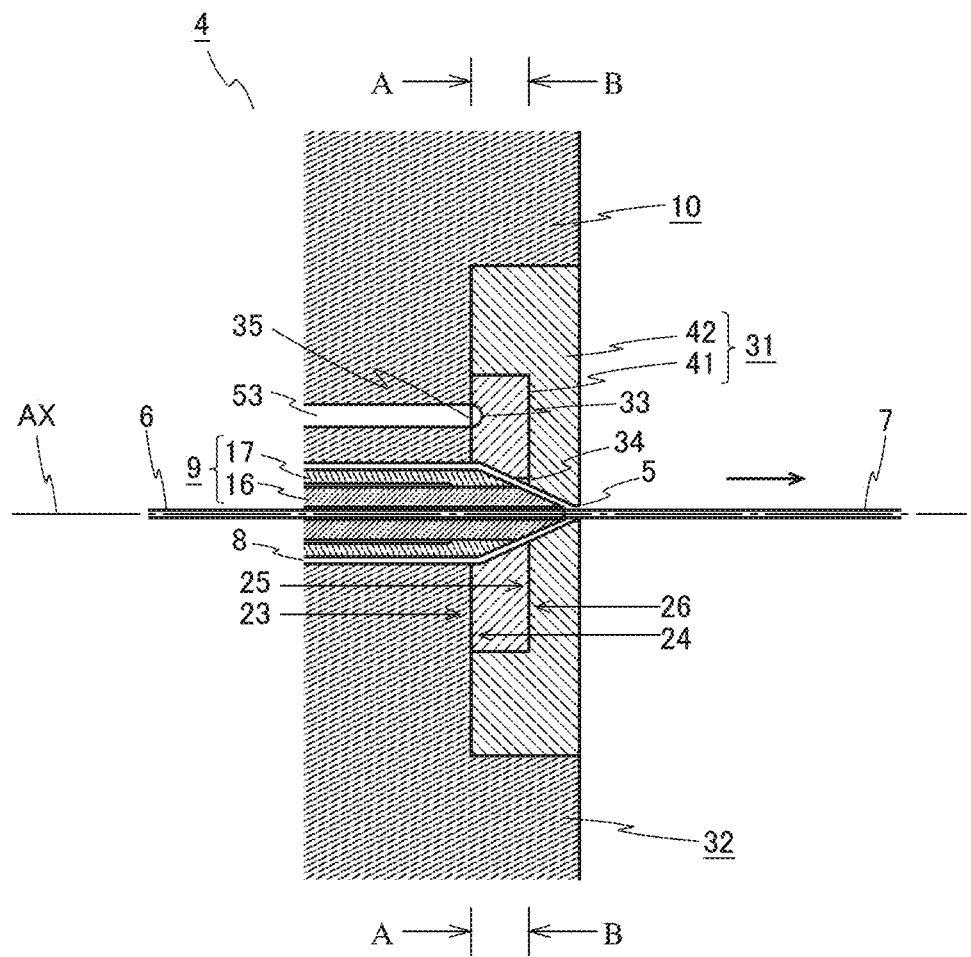
FIG. 5A is an enlarged view of a portion Z shown in FIG. 4.
Figure 5B:
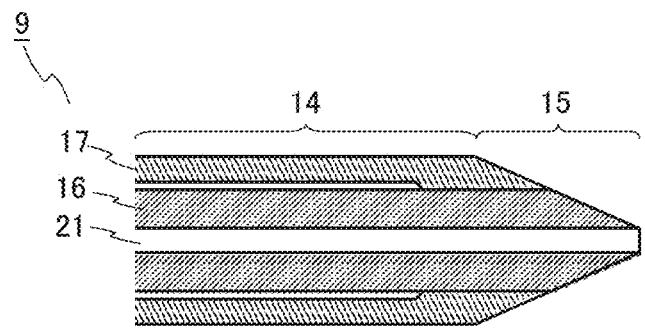
FIG. 5B is an enlarged view of an inner die shown in FIG. 5A.

FIG. 1 is an upper view showing the general arrangement of a flexible tube production apparatus according to the embodiment, FIG. 2 is a front view showing the general arrangement of the flexible tube production apparatus shown in FIG. 1, FIG. 3 is a sectional view taken along line shown in FIG. 2, FIG. 4 is a sectional view taken along line IV-IV shown in FIG. 2, FIG. 5A is an enlarged view of a portion Z shown in FIG. 4, and FIG. 5B is an enlarged view of an inner die shown in FIG. 5A.

A flexible tube production apparatus 100 is an apparatus for extrusion molding a flexible tube 7 using resins and includes a first extruder 1, a second extruder 2, a third extruder 3, a die 4, a first valve 11, a second valve 12, and a third valve 13. Here, the flexible tube production apparatus 100 is fixed on a predetermined table, etc., via a pedestal. Also, although unillustrated, at the upstream side and the downstream side of the die 4, a supplying apparatus for supplying a braided wire 6, a cooling apparatus that cools the extrusion molded flexible tube 7, a drawing apparatus that draws out the flexible tube 7, etc., are provided as appropriate. The braided wire 6 is conveyed from a rear side to a front side of the flexible tube production apparatus 100. The braided wire 6 is, for example, that in a state in which a braid (mesh tube) is provided on an inner layer tube and a core wire (guide wire) is inserted through a hollow portion in the inner layer tube. The flexible tube 7 is that with which an outer layer tube is provided on a surface of the braided wire 6 and a catheter shaft can be obtained by extracting the core wire of the braided wire 6 after molding the outer layer tube.

The first extruder 1, the second extruder 2, and the third extruder 3 are each, for example, a screw extruder and can melt pellets of resin and perform extrusion at a fixed speed from a discharge port at a front end. A first resin, a second resin, and a third resin that differ in hardness are respectively supplied to the first extruder 1, the second extruder 2, and the third extruder 3. Specifically, the first resin is a resin that is highest in hardness, the second resin is a resin that is more flexible than the first resin, and the third resin is a resin that is even more flexible than the second resin. The molten resins that are extruded from the first extruder 1, the second extruder 2, and the third extruder 3 are supplied to a flow passage 8 of the dies 4 via the first valve 11, the second valve 12, and the third valve 13.

The die 4 has a penetrating hole 21 through which the braided wire 6 is inserted, an extrusion port 5 that extrudes the resins onto the surface of the braided wire 6 passing through the penetrating hole 21, and the flow passage 8 that is connected to the extrusion port 5. The extrusion port 5 is an opening that is a downstream side end portion of the flow passage 8 formed inside the die 4.

As shown in FIG. 3 to FIG. 5A, the die 4 includes an inner die 9 and an outer die 10. As shown in the enlarged view of FIG. 5B, the inner die 9 has a straight portion 14 of circular columnar outer shape and a convergent tapered portion 15 that is provided closer to the extrusion port 5 side than the straight portion 14. The outer die 10 has a hollow portion and houses the inner die 9 in the hollow portion. In a state in which the inner die 9 is housed in the hollow portion of the outer die 10, a predetermined gap is formed between an outer surface of the inner die 9 and an inner surface of the hollow portion and the flow passage 8 that is connected to the extrusion port 5 is formed by the gap.

As shown in FIG. 4 and FIG. 5A, the outer die 10 according to the present embodiment includes a first divided body 31 and a second divided body 32. The first divided body 31 houses a portion of the inner die 9 of a predetermined range from a front end of the tapered portion 15 and the second divided body 32 houses a portion of the inner die 9 further to a rear side (left side in FIG. 4 and FIG. 5A) than the portion housed in the first divided body 31.

The first divided body 31 of the outer die 10 is constituted of a first die 41 of flat plate shape and a second die 42 in which the first die 41 is fitted. Details of the first die 41 and the second die 42 will be described later.

Also, as shown in FIG. 5B, the inner die 9 according to the present embodiment is constituted of a tubular portion 16 that includes the penetrating hole 21 and a rotating portion 17 of tubular shape that surrounds the tubular portion 16. The tubular portion 16 is fixed to a housing 18 and its rotation around a central axis is disabled. The rotating portion 17 has a hollow portion that houses the tubular portion 16 and at least a portion of an inner circumferential surface of the rotating portion 17 is in contact with an outer circumferential surface of the tubular portion 16. The rotating portion 17 is attached to a motor 19 and is rotatable in accordance with a rotating force of the motor 19 while the portion of the inner circumferential surface slides against the outer circumferential surface of the tubular portion 16. The rotating portion 17 is a member for mixing the first resin and the second resin present inside the flow passage 8 and grooves, pin, projections, etc., for promoting mixing of the resins are provided on an outer circumferential surface of the rotating portion 17.

The first valve 11 is provided between the first extruder 1 and the flow passage 8 of the die 4. The first valve 11 is switchable between a state in which the first extruder 1 and the flow passage 8 of the die 4 are in communication and a state in which the first extruder 1 and the flow passage 8 of the die 4 are interrupted from each other. The second valve 12 is provided between the second extruder 2 and the flow passage 8 of the die 4 and is switchable between a state in which the second extruder 2 and the flow passage 8 of the die 4 are in communication and a state in which the second extruder 2 and the flow passage 8 of the die 4 are interrupted from each other. Similarly, the third valve 13 is provided between the third extruder 3 and the flow passage 8 of the die 4 and is switchable between a state in which the third extruder 3 and the flow passage 8 of the die 4 are in communication and a state in which the third extruder 3 and the flow passage 8 of the die 4 are interrupted from each other. The first valve 11, the second valve 12, and the third valve 13 each include, for example, a valve element of circular columnar shape that is rotatable around a predetermined rotational axis, a case that houses the valve element, and a driving device such as a motor, etc., that rotates the valve element. The valve element and the case are provided with a plurality of flow passages that are formed by grooves and penetrating holes and connection states of the flow passages provided in the valve element and the case change in accordance with a rotational position of the valve element to enable control to a state in which an extruder is connected to the flow passage 8 and a state in which the extruder and the flow passage are interrupted. Preferably, when any of the first valve 11, the second valve 12, and the third valve 13 is in the state in which the corresponding extruder and the flow passage 8 are interrupted from each other, the resin supplied from the corresponding extruder can be unloaded (discarded). By such arrangement, internal pressure fluctuations of the resins supplied from the respective extruders to the valves can be suppressed to enable the resins to be supplied from the respective valves to the flow passage 8 of the die 4 with stability. Here, as long as the above-described supply control of the resins can be performed, the first valve 11, the second valve 12, and the third valve 13 are not restricted in particular in arrangement and position and may be provided at portions besides the locations indicated in FIG. 1 to FIG. 4.

As shown in FIG. 3, a first supply passage 51 connecting the first valve 11 and the flow passage 8, a second supply passage 52 connecting the second valve 12 and the flow passage 8 are provided in an interior of the die 4. Further, as shown in FIG. 4 and FIG. 5A, a third supply passage 53 connecting the third valve 13 and the flow passage 8 are provided in the interior of the die 4. A relationship of the first supply passage 51, the second supply passage 52, and the third supply passage 53 with respect to the flow passage 8 will be described later.

The flexible tube production apparatus 100 further includes a controller 20. The controller 20 includes a computer that includes a CPU, a memory, a storage device, a communication interface, etc., and is connected to the first extruder 1, the second extruder 2, the third extruder 3, the first valve 11, the second valve 12, the third valve 13, and the motor 19 via unillustrated signal lines. The controller 20 controls operations of the respective devices that are connected via the signal lines. Also, the controller 20 may also perform control of various devices disposed at the upstream side and the downstream side of the flexible tube production apparatus 100.

Details of the first divided body 31 will now be described with reference to FIG. 5A to FIG. 9.

Figure 6:
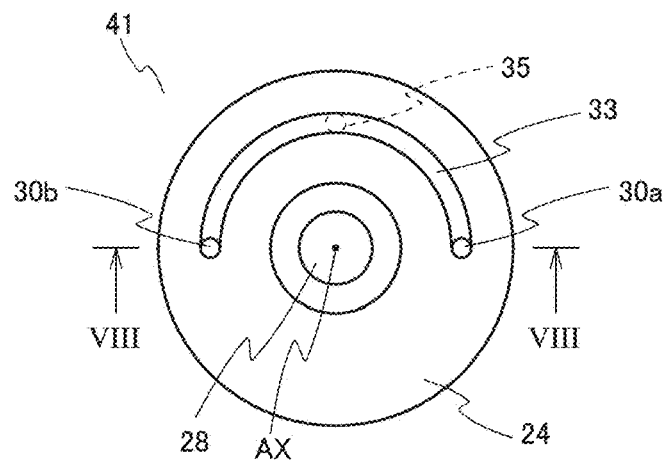
FIG. 6 is a plan view of a first die shown in FIG. 5A.
Figure 7:
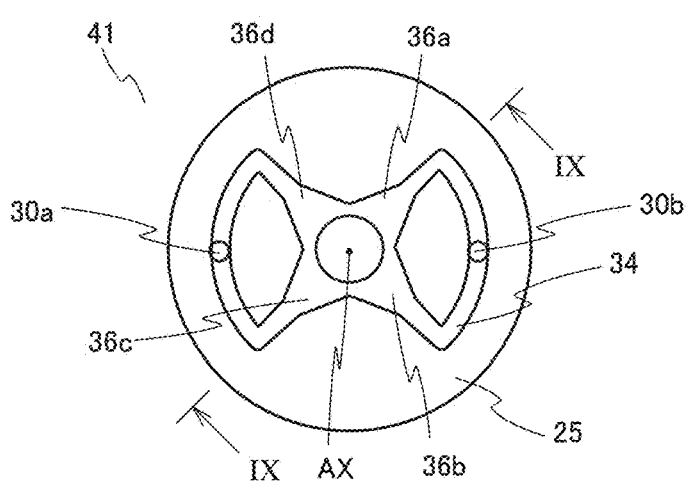
FIG. 7 is a rear view of the first die shown in FIG. 6.
Figure 8:
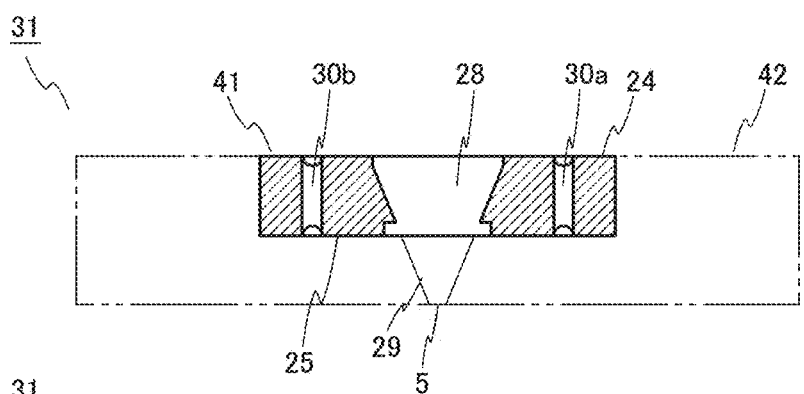
FIG. 8 is a sectional view taken along line VIII-VIII shown in FIG. 6.
Figure 9:
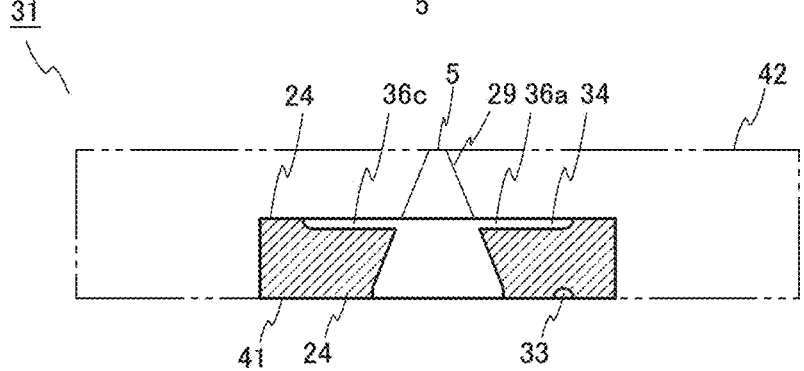
FIG. 9 is a sectional view taken along line IX-IX shown in FIG. 7.

FIG. 6 is a plan view of the first die shown in FIG. 5A and FIG. 7 is a rear view of the first die shown in FIG. 6. FIG. 6 corresponds to a diagram as viewed from line A-A shown in FIG. 5A and FIG. 7 corresponds to a diagram as viewed from line B-B shown in FIG. 5A. FIG. 8 is a sectional view taken along line VIII-VIII shown in FIG. 6 and FIG. 9 is a sectional view taken along line IX-IX shown in FIG. 7.

As mentioned above, the first divided body 31 that constitutes a portion of the outer die 10 includes the first die 41 of flat plate shape and the second die 42 that is combined with the first die 41.

The first die 41 has a flat surface 24 at one side and a flat surface 25 parallel to the flat surface 24 at another side. As shown in FIG. 6, FIG. 8, and FIG. 9, a hole portion 28 that narrows in inner diameter toward the second die 42, that is, from the flat surface 24 to the flat surface 25, penetrating holes 30a and 30b that extend in parallel to a central axis of the hole portion 28, and grooves 33 and 34 are formed in the first die 41. The hole portion 28 is a portion that constitutes a portion of the hollow portion of the outer die 10. The groove 33 is formed such as to connect a portion overlapping with an opening portion 35 (indicated by broken lines in FIG. 6) provided in a flat surface 23 of the second divided body 32 to opening portions of the penetrating holes 30a and 30b at the flat surface 24 side. Although the groove 33 is formed to a semicircular shape in the example of FIG. 6, the shape of the groove 33 is not restricted in particular as long as it can connect the opening portion 35 of the second divided body 32 to the penetrating holes 30a and 30b. The groove 34 is formed such as to connect opening portions of the penetrating holes 30a and 30b at the flat surface 25 side to an opening portion of the hole portion 28 at the flat surface 25 side. In the example FIG. 7, the groove 34 has a plurality of branch portions 36a to 36d and each of the branch portions 36a to 36d are connected to the opening portion of the hole portion 28 at the flat surface 25 side. Also, the branch portions 36a to 36d are formed to be n-fold symmetrical (fourfold symmetrical in the example of FIG. 7; n is a natural number) with respect to a center of the hole portion 38 on the flat surface 25.

The second die 42 has a flat surface 26 at one side and has the extrusion port 5 at another side. As indicated by alternate long and two short dashed line in FIG. 8 and FIG. 9, a hole portion 29 that narrows in inner diameter from the flat surface 26 toward the extrusion port 5 is formed in the second die 42. The hole portion 29 is a portion that constitutes a front end portion of the hollow portion of the outer die 10 and has a shape that is continuous with the hole portion 28 formed in the first die 41.

As shown in FIG. 5A, the flat surface 23 that is orthogonal to a central axis of the penetrating hole 21 is provided at a front side (side at which the extrusion port 5 is disposed) of the second divided body 32. As mentioned above, the opening portion 35 is formed in the flat surface 23. The opening portion 35 is a portion of a middle of the third supply passage 53 that connects the third valve 13 and the flow passage 8 of the die 4.

The die 4 is arranged by inserting the tubular portion 16 and the rotating portion 17 that become the inner die 9 in the hollow portion of the second divided body 32 and attaching the first die 41 and the second die 42 that constitute the first divided body 31 to the flat surface of the second divided body 32. The first die 41 and the second die 42 are fixed to the second divided body 32 using an unillustrated bolt or other fixture. In a state in which the first die 41 and the second die 42 are fixed to the second divided body 32, the flat surface 23 provided on the second divided body 32 and the flat surface 24 of the first die 41 are put in close contact and the flat surface 25 of the first die 41 and the flat surface 26 of the second die 42 are put in close contact.

As shown in FIG. 5A to FIG. 9, the groove 33 that overlaps with the opening portion 35 provided in the second divided body 32, the penetrating holes 30a and 30b that are connected to the groove 33, and the groove 34 that connects the penetrating holes 30a and 30b to the hole portion 28 are formed in the first die 41. A flow passage leading from the opening portion 35 of the second divided body 32 to the hole portion 28 via the groove 33, the penetrating holes 30a and 30b, and the groove 34 is thus formed in an interior of the first divided body 31. The hole portion 28 is a portion that constitutes a portion of the hollow portion of the outer die 30 and, as shown in FIG. 5A, the tapered portion 15 of the inner die 9 is disposed in an interior of the hole portion 28. That is, the flow passage formed in the first divided body 31 connects the opening portion 35 of the second divided body 32 with a portion of the flow passage 8 of the die 4 formed between the tapered portion 15 and the outer die 10 and constitutes a portion of a predetermined range from a downstream side end portion of the third supply passage 53.

Thus, in the flexible tube production apparatus 100 of the present embodiment, downstream side end portions of the first supply passage 51 and the second supply passage 52 provided in the die 4 are connected to a portion of the flow passage 8, provided in the die 4, formed between the straight portion 14 and the outer die 10 (see FIG. 3). On the other hand, the downstream side end portion of the third supply passage 53 is connected to a portion of the flow passage 8 formed between the tapered portion 15 and the outer die 10.

A method for extruding a flexible tube using the flexible tube production apparatus 100 will now be described. In the following description, an example where after the most flexible third resin is extruded to form a soft tip, the second resin is extruded in continuation to the soft tip, a mixed resin of the first resin and the second resin is extruded while increasing a mixing ratio of the first resin, and finally just the first resin is extruded will be described.

First, before extruding the third resin for the soft tip, the controller 20 sets up a state in which the first valve 11 and the flow passage 8 are interrupted from each other, the third valve 13 and the flow passage 8 are interrupted from each other, and the second valve 12 and the flow passage 8 are connected to each other. In this state, the second resin extruded from the second extruder 2 is supplied to the flow passage 8 and an interior of the flow passage 8 is filled with the second resin.

Next, the controller 20 sets up a state in which the first valve 11 and the flow passage 8 are interrupted from each other, the second valve 12 and the flow passage 8 are interrupted from each other, and the third valve 13 and the flow passage 8 are connected to each other. In this state, the third resin extruded from the third extruder 3 is supplied to the flow passage 8. As mentioned above, the downstream side end portion of the third supply passage 53 connecting the third valve 13 and the flow passage 8 is connected to the portion of the flow passage 8 between the tapered portion 15 and the outer die 10, that is, to the front end portion of the flow passage 8. The third resin supplied to the flow passage 8 extrudes the second resin present further to the extrusion port 5 side than a location of connection of the flow passage 8 and the downstream side end portion of the third supply passage 53 and thereafter, just the third resin is extruded in tubular shape from the extrusion port 5. In this process, a large portion of the flow passage 8 is in a state in which the second resin remains.

Next, the controller 20 sets up the state in which the first valve 11 and the flow passage 8 are interrupted from each other, the third valve 13 and the flow passage 8 are interrupted from each other, and the second valve 12 and the flow passage 8 are connected to each other. When in this state, the second resin extruded from the second extruder 2 is supplied to the flow passage 8, the second resin remaining in the flow passage 8 of the die 4 is extruded in tubular shape in continuation to a portion that was extrusion molded with just the third resin. Here, if a length of a portion constituted of the second resin that is continuous to the soft tip is not required to be that long, the present step (step of supplying the second resin to the flow passage 8) may be skipped and the next step (step of supplying the first resin to the flow passage 8) may be entered.

Next, the controller 20 sets up a state in which the second valve 12 and the flow passage 8 are interrupted from each other, the third valve 13 and the flow passage 8 are interrupted from each other, and the first valve 11 and the flow passage 8 are connected to each other. In this state, the first resin extruded from the first extruder 1 is supplied to the flow passage 8. Although immediately after switching of the valves, the second resin remaining inside the flow passage 8 is extruded from the extrusion port 5, the ratio of the first resin inside the flow passage 8 of the die 4 increases with elapse of time. Therefore, a mixed resin of the first resin and the second resin is extruded from the extrusion port of the die 4 and the mixing proportion of the first resin increases gradually. Consequently, a resin layer (resin tube) that increases continuously in hardness is extruded in continuation to the soft tip. Here, the second resin remaining inside the flow passage of the die 4 and the newly supplied first resin are mixed uniformly by rotation of the rotating portion 17 of the inner die 9.

As the supply of the first resin from the first extruder 1 is continued, the resin inside the flow passage 8 of the die 4 is ultimately replaced completely by the first resin and just the first resin is extruded from the extrusion port 5 of the die 4.

By performing the above-described extrusion of resins on the surface of the braded wire 6 that is inserted into the tubular portion 16 of the inner die 9 and fed out from the extrusion port 5, the flexible tube 7 with which the surface of the braded wire 6 is covered continuously with a resin layer that decreases continuously in hardness and an even more flexible resin layer (soft tip) at a front end thereof can be produced. Here, the soft tip may be formed by extruding the third resin onto the surface of the braided wire 6 or may be formed on a portion without the braded wire 6. A flexible tube with which the soft tip is provided at a portion without the braded wire 6 can be obtained, for example, by synchronizing a timing at which a front end of the braided wire arrives at the extrusion port and a timing at which the third valve 13 is interrupted and the first valve 11 or the second valve 12 is opened.

In the flexible tube production apparatus 100 according to the present embodiment, the downstream side end portions of the first supply passage 51 and the second supply passage 52 provided in the die 4 are connected to the portion of the flow passage 8, provided in the die 4, formed between the straight portion 14 and the outer die 10 and, on the other hand, the downstream side end portion of the third supply passage 53 is connected to the portion of the flow passage 8 formed between the tapered portion 15 and the outer die 10, that is, to the front end portion of the flow passage 8. Due to connecting the downstream side end portion of the third supply passage 53 to the front end portion of the flow passage 8, the third resin remaining inside the flow passage 8 when the resin supplied to the flow passage 8 is switched from the most flexible third resin to another resin (the first resin or the second resin) is extremely low in amount. A length of a portion that is extruded with the third resin being mixed with another resin (the first resin or the second resin)

after the third resin has been extrusion molded can thus be made short. When in continuation to extrusion molding of the third resin that is most flexible, a portion that changes continuously in mixing ratio of the first resin and the second resin is extrusion molded, a portion constituted of the third resin, a portion with which a mixture of the third resin and the second resin is extruded, and a portion with which a proportion of the second resin decreases continuously are formed in that order. With the flexible tube production apparatus 100 according to the present embodiment, by devising the location of connection of the third supply passage 53 and the flow passage 8 as described above, a portion with which a mixture of the third resin and another resin is extruded can be made short and therefore, a soft tip portion provided at a front end portion (a length of a portion more flexible than the second resin, that is, a total length of the portion constituted of the third resin and the portion with which the mixture of the third resin and the second resin is extruded) can be made short.

By cutting the portion constituted of the third resin to an appropriate length after the extrusion molding, the flexible tube having the soft tip that is extremely short (for example, of several mm) at the front end can be obtained. Although if the portion with which the mixture of the third resin and another resin is extruded is long, there is a limit to reducing the length of the soft tip portion provided at the front end even if the portion constituted of the third resin is cut, with the flexible tube production apparatus 100 according to the present embodiment, the portion with which the mixture of the third resin and another resin is extruded can be made short and therefore, reduction of the length of the soft tip portion can be realized by cutting the portion constituted of the third resin.

Also, with the present embodiment, the outer die 10 is constituted of the first divided body 31 that houses the portion of the inner die 9 of the predetermined range from the front end of the tapered portion 15 and the second divided body 32 that houses the remaining portion of the inner die 9 and the first divided body 31 is constituted of the first die 41 and the second die 42. An extrusion diameter (outer diameter) of a resin layer can be defined by an inner diameter of the extrusion port 5 and by arranging as in the present embodiment, change of extrusion diameter can be performed easily by preparing a plurality of the second dies 42 that differ in the inner diameter of the extrusion port 5.

Also, with the present embodiment, the branch portions 36a to 36d of the groove 34 formed in the flat surface 25 of the first die 41 are formed such as to be of n-fold symmetry (where n is a natural number). When arranged thus, the third resin can be supplied uniformly to the flow passage 8 from circumferential directions and therefore, stability of extrusion molding and uniformity of outer diameter are excellent.

Here, the extrusion molding method described above is one example, and an order of extrusion of the resins can be reversed. That is, the first resin may be extruded first, a mixed resin of the first resin and the second resin may be extruded while increasing a mixing ratio of the second resin, and, after extruding just the second resin as necessary, the third resin may be extruded in continuation to form the soft tip. The resin remaining in the flow passage 8 when the resin supplied to the flow passage 8 is switched from the first resin or the second resin to the most flexible third resin is extremely low in amount. A length of a portion that is extruded with the third resin being mixed with another resin (the first resin or the second resin) after the soft tip has been extrusion molded can thus be made short and therefore, an extremely short soft tip can be obtained.

Also, an upper limit and lower limit of the proportion of the second resin in the mixed resin of the first resin and the second resin can be set arbitrarily within an arbitrary range from 0 to 100%.

Also, although with the embodiment described above, an example where the two penetrating holes 30a and 30b are provided in the first die 41 was described, the number of penetrating holes may be arbitrary. Also, the groove 34 provided in the flat surface 25 of the first die 41 does not have to be branched and if it is branched, the number of branch portions is arbitrary as long as it is not less than 2. If a plurality of branch portions are provided in the groove 34, although it is preferable for the branch portions to be n-fold symmetric, positions of the branched portions do not have to be rotationally symmetric.

The present invention can be used as an apparatus for producing a flexible tube such as a catheter shaft used in preparing a catheter for medical use, a tube used in an endoscope, etc.

Although the present invention has been described in detail above, the above description merely provides an example in all respects and is not intended to limit the scope thereof. It is needless to say that various improvements and modifications can be made without departing from the scope of the present invention.

What is claimed is:

1. A flexible tube production apparatus for extrusion molding a flexible tube, the flexible tube production apparatus comprising:
   a first extruder that extrudes a first resin;
   a second extruder that extrudes a second resin more flexible than the first resin;
   a third extruder that extrudes a third resin more flexible than the first resin and the second resin;
   a die that has a first penetrating hole through which a braded wire is inserted, an extrusion port extruding the resins onto a surface of the braded wire passing through the first penetrating hole, and a flow passage in communication with the extrusion port;
   a first valve that is switchable between a state in which the first extruder and the flow passage of the die are in communication and a state in which the first extruder and the flow passage of the die are interrupted from each other;
   a second valve that is switchable between a state in which the second extruder and the flow passage of the die are in communication and a state in which the second extruder and the flow passage of the die are interrupted from each other; and
   a third valve that is switchable between a state in which the third extruder and the flow passage of the die are in communication and a state in which the third extruder and the flow passage of the die are interrupted from each other; and
   wherein a first supply passage connecting the first valve and the flow passage, a second supply passage connecting the second valve and the flow passage, and a third supply passage connecting the third valve and the flow passage are provided inside the die,
   the die has:
      an inner die that has a straight portion of circular columnar outer shape and a convergent tapered portion provided closer to the extrusion port side than the straight portion; and
      an outer die that has a hollow portion and houses the inner die in the hollow portion with there being a predetermined interval, serving as the flow passage, from an outer surface of the inner die, and downstream side end portions of the first supply passage and the second supply passage are connected to a portion of the flow passage formed between the straight portion and the outer die, and a downstream side end portion of the third supply passage is connected to a portion of the flow passage formed between the tapered portion and the outer die.

2. The flexible tube production apparatus according to claim 1, wherein the outer die includes:
  a first divided body that has the extrusion port and houses a portion of the inner die of a predetermined range from a front end of the tapered portion; and
  a second divided body that houses a remaining portion of the inner die, and
a portion of the third supply passage of a predetermined range from the downstream side end portion is formed in the first divided body.

3. The flexible tube production apparatus according to claim 2, wherein the second divided body has a first flat surface that is orthogonal to a central axis of the first penetrating hole and is in surface contact with the first divided body, the first divided body includes:
  a first die that has a second flat surface that is in surface contact with the first flat surface at one side and has a third flat surface that is parallel to the second flat surface at another side; and
  a second die that has a fourth flat surface that is in surface contact with the third flat surface at one side and has the extrusion port at another side,
an opening portion that is a portion of the third supply passage is provided in the first flat surface of the second divided body, the first die is provided with:
  a first hole portion that constitutes a portion of the first penetrating hole and narrows in diameter toward the second die;
  a second penetrating hole that extends in parallel to the central axis of the first penetrating hole;
  a first groove that is provided in the second flat surface and connects a portion overlapping with the opening portion in the first flat surface and the second penetrating hole; and
  a second groove that is provided in the third flat surface and connects the second penetrating hole and the first hole portion, and
the second die is provided with a second hole portion that constitutes a portion of the first penetrating hole, is continuous to the first hole portion, and narrows in diameter toward the extrusion port.

4. The flexible tube production apparatus according to claim 3, wherein the second groove has a plurality of branch portions that are connected to the first hole portion and respective downstream side end portions of the branch portions are disposed in n-fold symmetry (where n is a natural number) with respect to a center of the first hole portion.

5. The flexible tube production apparatus according to claim 1, comprising a controller that controls the first valve, the second valve, and the third valve, and wherein the controller connects the third extruder, in a state of extruding the third resin, to the flow passage for a predetermined time and thereafter interrupts the third extruder and the flow passage from each other and connects the first extruder, in a state of extruding the first resin, or the second extruder, in a state of extruding the second resin, to the flow passage.

* * * * *